US007263106B2

(12) United States Patent
Matthews et al.

(10) Patent No.: US 7,263,106 B2
(45) Date of Patent: Aug. 28, 2007

(54) SYSTEM AND PROTOCOL FOR FRAME RELAY SERVICE OVER THE INTERNET

(75) Inventors: Abraham R. Matthews, San Jose, CA (US); Sajit Bhaskaran, Sunnyvale, CA (US); Lianghwa Jou, Incline Village, NV (US); Sachin Desai, Santa Clara, CA (US)

(73) Assignee: Fortinet, Inc., Sunnyvale, CA (US)

( * ) Notice: Subject to any disclaimer, the term of this patent is extended or adjusted under 35 U.S.C. 154(b) by 624 days.

(21) Appl. No.: 10/067,106

(22) Filed: Feb. 4, 2002
(Under 37 CFR 1.47)

(65) Prior Publication Data
US 2003/0212817 A1 Nov. 13, 2003

Related U.S. Application Data

(63) Continuation of application No. 09/871,165, filed on May 31, 2001, now abandoned, which is a continuation of application No. 09/663,486, filed on Sep. 13, 2000, now abandoned.

(51) Int. Cl.
*H04J 3/16* (2006.01)
(52) U.S. Cl. .................... 370/466; 370/474; 713/153
(58) Field of Classification Search .............. None
See application file for complete search history.

(56) References Cited

U.S. PATENT DOCUMENTS

| 5,742,668 A | 4/1998 | Pepe et al. | |
| 5,781,532 A * | 7/1998 | Watt | 370/236 |
| 5,850,391 A | 12/1998 | Essigmann | |
| 5,901,352 A | 5/1999 | St-Pierre et al. | |
| 5,949,773 A | 9/1999 | Bhalla et al. | |
| 6,148,337 A * | 11/2000 | Estberg et al. | 709/224 |
| 6,286,049 B1 * | 9/2001 | Rajakarunanayake et al. | 709/227 |
| 6,426,944 B1 | 7/2002 | Moore | |
| 6,438,612 B1 * | 8/2002 | Ylonen et al. | 709/249 |
| 6,587,433 B1 * | 7/2003 | Borella et al. | 370/230 |
| 6,798,785 B1 * | 9/2004 | Sasson et al. | 370/466 |
| 2002/0055988 A1 * | 5/2002 | Crooks | 709/220 |

\* cited by examiner

*Primary Examiner*—Bob A. Phunkulh
(74) *Attorney, Agent, or Firm*—Hamilton, DeSanctis & Cha, LLP

(57) ABSTRACT

The present invention provides a system, protocol and method for communications over the Internet. The system includes at least one router connectable to a first user or subscriber location. An Internet protocol service processing switch (IPSX) is connected to the at least one router to format or encapsulate the message for secure transmission over the Internet. The message is then preferably transmitted over the Internet via an Internet Protocol Security (IPSec) tunnel for secure transmission to the addressed destination.

40 Claims, 7 Drawing Sheets

SYSTEM AND PROTOCOL FOR FRAME RELAY SERVICE OVER THE INTERNET

RELATED APPLICATIONS

This application is a continuation of U.S. Ser. No. 09/871,165, filed on May 31, 2001 now abandoned, which is a continuation of U.S. Ser. No. 09/663,486, filed on Sep. 13, 2000 now abandoned.

FIELD OF THE INVENTION

The present invention relates generally communications, and more particularly to a system and protocol for frame relay communications over the Internet.

BACKGROUND OF THE INVENTION

Frame Relay is an access standard defined by the ITU-T in the I.122 recommendation, "Framework for Providing Additional Packet Mode Bearer Services." Frame Relay services employ a form of packet switching analogous to a streamlined version of X.25 networks. The packets are in the form of "frames" which can be variable in length. Thus a key advantage is that a frame relay network can accommodate data packets of various sizes and that are associated with virtually any native data protocol. Accordingly, frame relay services have become a popular replacement for dedicated or private leased-line connections between enterprise LANs located at multiple sites.

Today, however, service providers (SPs) and their subscribers have another, more cost effective alternative for connecting different sites securely, the Internet. Enterprise subscribers want to preserve their investments in Frame Relay equipment while extending the reach of their private networks to new locations using a lower cost Internet (IP) solution. They also want to extend secure Internet access to existing locations served by frame relay without the additional expense of adding or replacing customer premises equipment (CPE) or acquiring access lines to these locations. They want to make the transition in a controlled manner at their own pace to minimize risks and maintain access to the existing frame relay network during the migration.

Additionally, current frame relay networks have some limitations. They have no built in access from the frame relay network or cloud to the Internet. Typically, separate arrangements are made for Internet access. Current frame relay networks also lack the Internet Protocol Security (IPSec) encryption and firewall features required for secure Internet access from corporations. Further, typical service level agreements (SLAs) for frame relay service as defined by the Frame Relay Forum (FRF) are fairly basic and conservative with little opportunity for provider or service differentiation. In contrast, differentiated services allows IP networks to offer enhanced services over and beyond what is currently being standardized by the FRF for frame relay service.

Accordingly, for all the reasons discussed above, and for other reasons that will become apparent upon reading and understanding the present specification, there is a need for a system and protocol that permits frame relay service over the Internet that is secure and provides the flexibility, economy and features provided by the Internet.

SUMMARY OF THE INVENTION

In accordance with the present invention, a system for communications over the Internet includes at least one router connectable to a first user or subscriber location. An Internet protocol service processing switch (IPSX) is connected to the at least one router to format or encapsulate the message for secure transmission over the Internet. The message is then preferably transmitted over the Internet via an Internet Protocol Security (IPSec) tunnel for secure transmission to the addressed destination.

In accordance with another embodiment of the present invention, a method for communication over the Internet includes generating a frame relay message. Overhead information may be stripped from the frame relay message and valid frames encapsulated in a frame relay over Internet protocol (FOIP) header. The FOIP header and message payload are encapsulated in a user datagram protocol (UDP/IP) and then the UDP/IP encapsulated message is transmitted over the Internet to a predetermined destination preferably via an IPSec tunnel.

DETAILED DESCRIPTION OF THE EMBODIMENTS

In the following detailed description of the embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
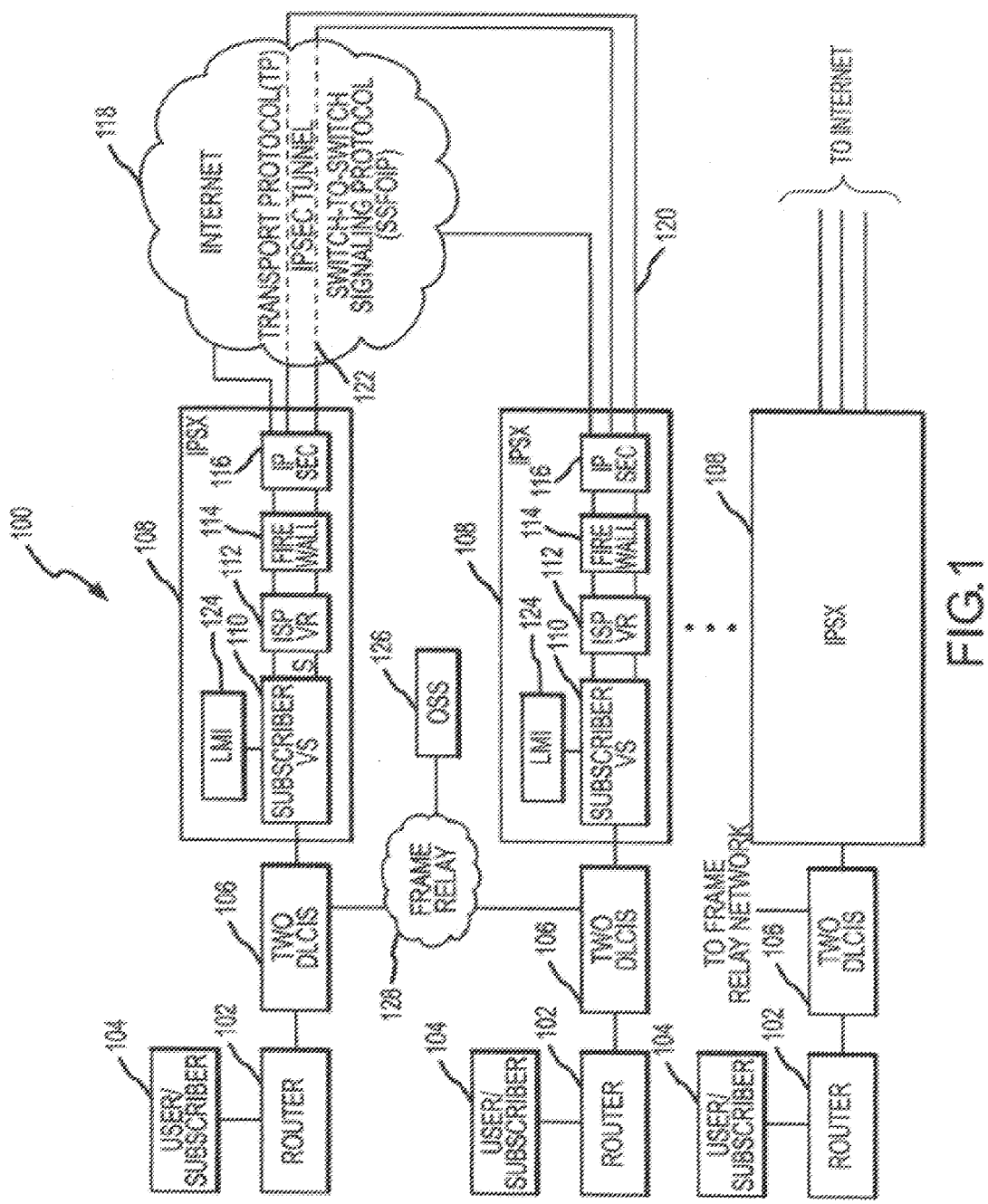
FIG. 1 is a block schematic diagram of a system for communications over the Internet in accordance with one embodiment of the present invention.

Referring initially to FIG. 1, a schematic diagram of a system for communications over the Internet in accordance with at least one embodiment of the present invention is shown. The system 100 includes a plurality of routers 102 at different locations or sites, Each of the routers 102 is connected to at least one user or subscriber 104. Each router 102 also preferably is associated with at least two data link connection identifiers (DLCIs) 106 for redundancy. The DLCIs 106 are shown in FIG. 1 as separate elements but may actually be part of the router 102. The system may also include multiple routers 102 at a site for redundancy.

The router 102/DLCI 106 is connected to an Internet protocol service processing switch (IPSX) 108. The IPSX may be an IPSX 9000™ as manufactured and sold by CoSine Communications, Inc., Redwood City Calif. In the embodiment shown in FIG. 1, the IPSX includes a virtual subscriber switch (VS) 110 coupled at one end to the router 102/DLCI 106 and connected to a virtual router (VR) 112 at another end or terminal. The virtual router (VR) 112 is coupled to a firewall 114 and the firewall 114 is connected to an Internet protocol security (IPSec) module 116. The IPSec 116 is then connectable to the Internet 118 for transmission of frame relay messages to other users/subscribers 104 or locations on the virtual private network (VPN) 120 formed by the system 100. In accordance with the present invention, the connection via the Internet is preferably via an IPSec tunnel 122 to provide secured transmissions from one location or user 104 to another. The connection via the Internet between one location or user 104 and another location or user 104 is analogous to a frame relay permanent virtual circuit (PVC).

The system 100 also includes a transport protocol (TP) for transmitting messages over the Internet. The transport protocol for frame relay payloads is based on user datagram protocol (UDP/IP), which is optionally IPSec ESP (enhanced service provider) protected in the transport mode. IPSec protection may be made the default. The IPSec tunnel 122 uses as the source IP address, the VR's address at the source and the address of the destination VR 112 at the remote end.

The payload transport protocol is complemented by a switch-to-switch signaling protocol (SSFOIP) that operates in parallel. Because multiple virtual switches 110 realizations will exist in distributed fashion, periodic synchronization between the virtual switches 110 will be necessary. The SSFOIP will also be based on UDP/IP. The SSFOIP is used to communicate status information about the different components within the system and to announce and set up the creation of new components or DLCIs for future service. The SSFOIP protocol header and payload are encapsulated in UDP.

The selection of non-hard state transport protocol such as UDP allows hot standby virtual switches to be easily implemented in the future. This protocol also makes the implementation simpler, more scalable and less susceptible to certain kinds of attacks. Additionally, it allows leverage of any future IP multicast infrastructure that might be deployed.

The virtual switch 110 will also implement the frame relay local management interface (LMI) 124 function for requesting and responding to status inquiry messages from other components in the system 100. For dual homed customer provided equipment (CPE), such as dual routers or dual bridges or other equipment, failure to respond accurately will result in black holed traffic. If a DLCI failure occurs, the system will be able to reroute using an Open System Interconnection (OSI) layer 3 or 2 route calculation algorithm. The SSFOIP is used to communicate status information between the components of the system 100.

The system 100 also includes an operating support system (OSS) 126 connected to the frame relay network 128. The initial provisioning or set up of the private virtual circuits (PVCs) and DLCIs may be done by the OSS 126 and communicated to each IPSX 108 by simple network management protocol (SNMP) which then sets up the VSs 110. A group of VSs that make up the virtual private network (VPN) 120 may then initiate SSFOIP exchanges. The OSS 126 will also be responsible for installing in each VS 110 the information or addresses to reach all other VSs in the VPN 120 or system 100.

Several protocols are currently being transported over frame relay networks that require frame sequence preservation. Two such protocols are system network architecture (SNA) and the IBM NETBIOS. Because normal frame relay service involves explicitly setting up and tearing down PVCs on an end to end basis, sequence preservation has been straightforward. In the current IP backbone routing environment, however, no such end-to-end mechanism exists. Accordingly, an alternate method of preserving frame sequence is needed. One approach is to implement an 8-bit sequence number as described in more detail below with reference to the IP datagram encapsulation of the payload message.

Figure 2:
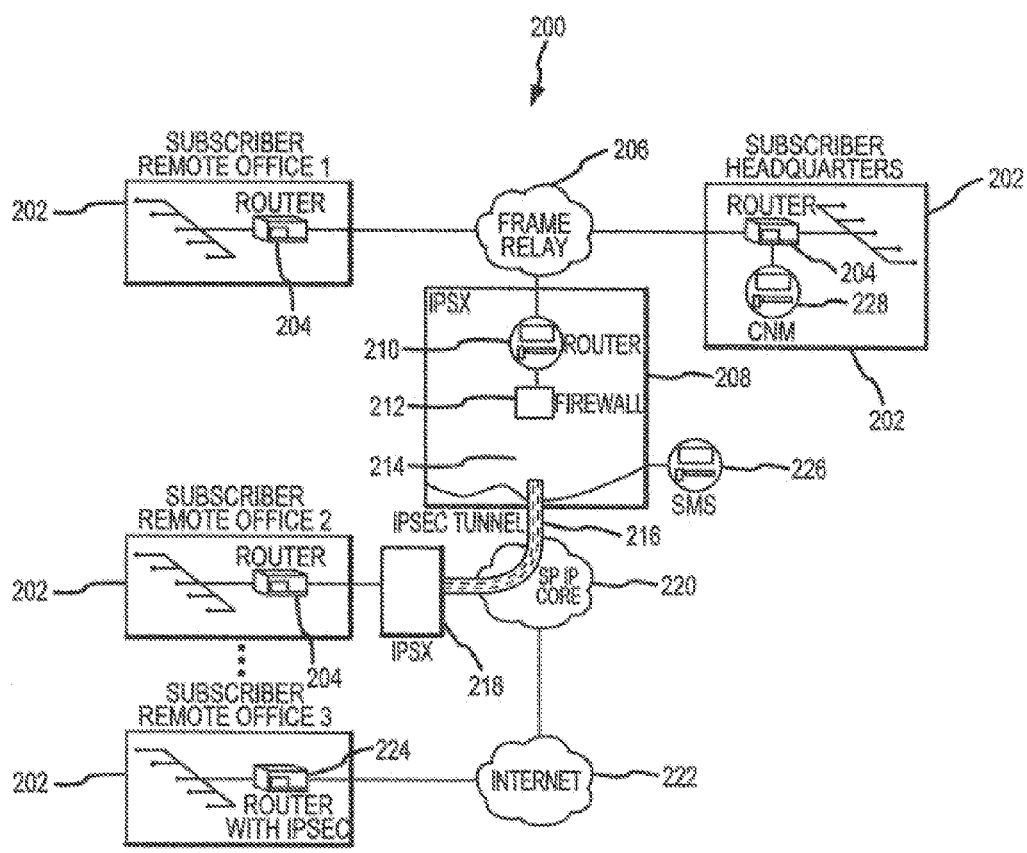
FIG. 2 is a block schematic diagram of a system for communications over the Internet in accordance with another embodiment of the present invention.

FIG. 2 is a block schematic diagram of a system for communications over the Internet in accordance with another embodiment of the present invention. The system 200 of FIG. 2 includes a plurality of subscriber remote offices 202. Each of the subscriber remote offices includes a router 204. The subscriber remote office 1 and the subscriber headquarters are each respectively connected to a frame relay network 206. The frame relay network is then connected to an IPSX 208. The IPSX includes a virtual router 210 connected to a firewall 212 and the firewall 212 is also connected to a IPSec module 214 or function. The IPSX 208 may then be connected via an IPSec tunnel 216 to another IPSX 218 through the service providers Internet core 220. In another connection or permanent virtual circuit (PVC), either of the subscriber remote offices 1 or 2 or subscriber headquarters 202 could be interconnected through the Internet to remote office 3 via a router 224 with an IPSec function to provide secure communications over the Internet.

The system 200 of FIG. 2 also includes a service management system (SMS) 226 for monitoring and managing traffic flow and to deploy and manage IP features and services to which the user has subscribed. The SMS 226 may be an InVision™ system as provide by CoSine Communications, Inc.

The system 200 of FIG. 2 also may include a customer network management (CNM) system 228 to provide reporting, status trend and forecast analysis for network planning and service modification. The CNM 228 may be an InGage™ system as also provided by CoSine Communications.

Figure 3:
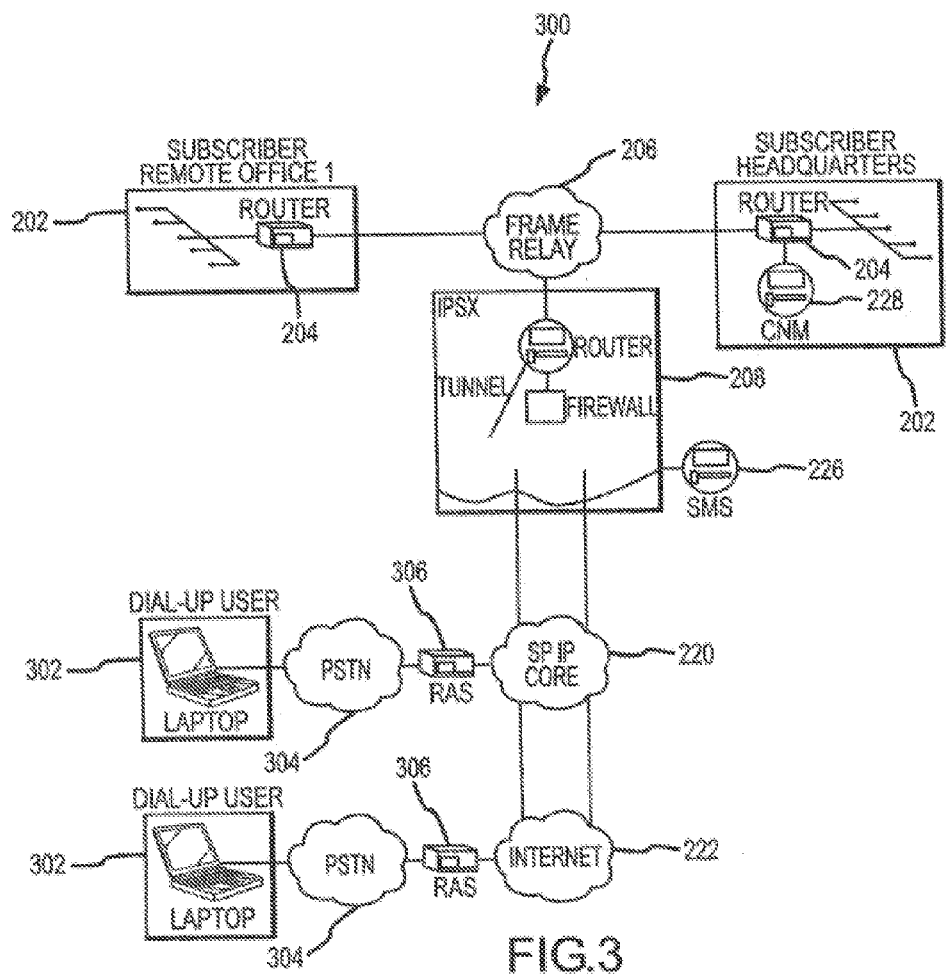
FIG. 3 is a block schematic diagram of a system for communications over the Internet for dial-up user access in accordance with a further embodiment of the present invention.

FIG. 3 is a block diagram of a system 300 for communications over the Internet for dial-up user access in accordance with a further embodiment of the present invention. The system 300 is similar to that of FIG. 2 except that a dial up user 302 accesses the network or system 300 through the public switched telephone network 304 by dialing a remote access server 306. The dial-up user is then connected to the IPSX 208 through the Internet 222 or the SP IP Core 220.

Figure 4:
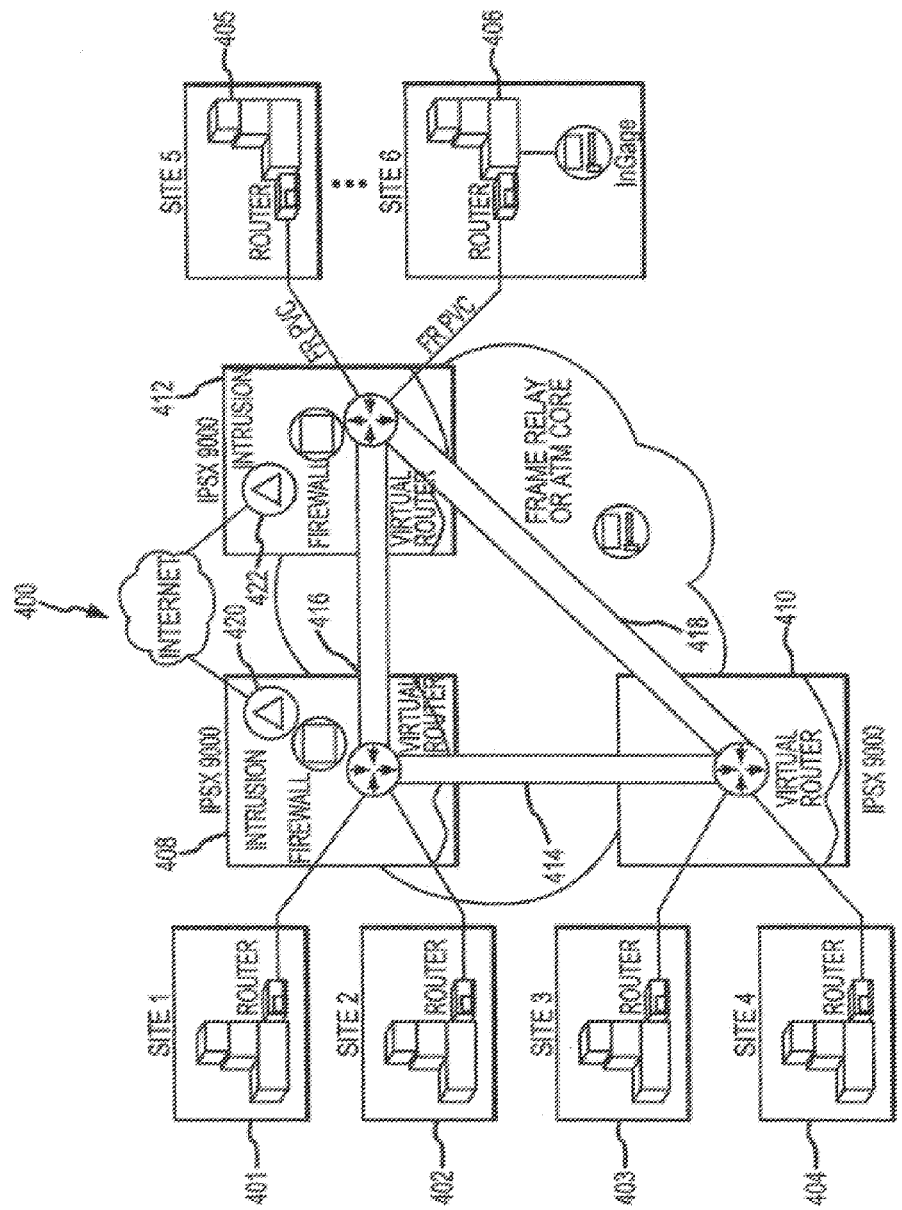
FIG. 4 is a block schematic diagram of an IP-enabled frame relay network layered with advanced Internet Application services in accordance with another embodiment of the present invention.

FIG. 4 is a schematic block diagram of an IP-enabled frame relay network 400 layered with advanced Internet application services in accordance with another embodiment of the present invention. The network 400 includes a plurality of different site locations 401-406. Each of the sites 401-406 is connected to an IPSX 408, 410 and 412. Sites 401 and 402 are connected to IPSX 408. Sites 403 and 404 are connected to IPSX 410 and sites 405 and 406 are connected to IPSX 412. The IPSXs 408, 410 and 412 are connected in a daisy chain fashion by a permanent virtual circuit (PVC) 414, 416 and 418. Each of the PVCs may contain a virtual router (not shown in FIG. 4). The IPSXs 408 and 412 each include an intrusion detector 420 and 422 to secure access to the Internet 424 and to guard against hackers.

Figure 5:
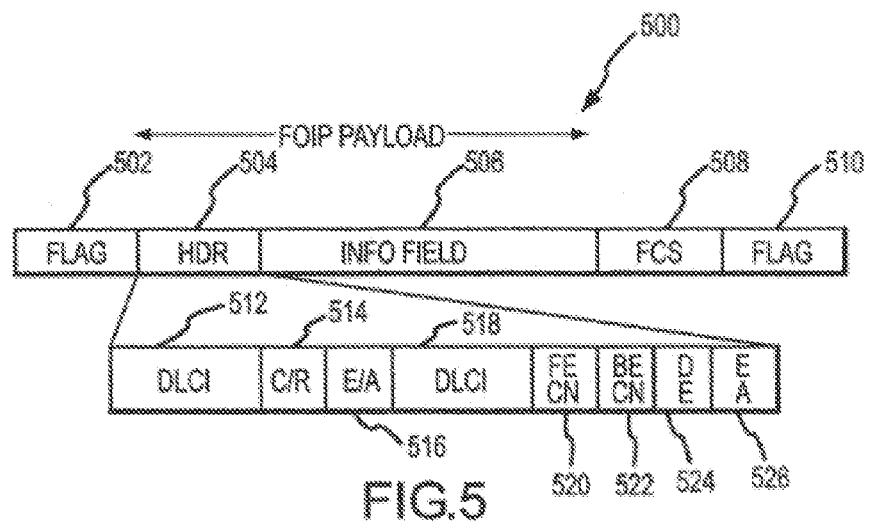
FIG. 5 is an illustration of the frame relay frame structure in accordance with one embodiment of the present invention.

FIG. 5 is an illustration a frame relay frame structure 500 in accordance with one embodiment of the present invention. The frame structure 500 includes a high level data link control (HDLC) flag group of bits or field 502, a header field or group of bits 504, an information field 506, a frame check sequence field 508 and another flag field 510. The header field 504 includes a data link connection identifier (DLCI) field or group of bits 512 (high order), a command/response (C/R) field 514, an address extension (E/A) field 516, another low order DLCI field 518, a forward explicit congestion notification (FECN) field (520), a backward explicit congestion notification (BECN) field 522, a discard eligibility (DE) field 524 and another address extension (EA) field 526. The FECN 520 notifies the receiving device that the network is experiencing congestion and the BECN 522 notifies the transmitting device that the network is experiencing congestion. The DE field 524 indicates what may be discarded if the event of network congestion of the subscriber has exceeded his committed burst rate (Bc) or Committed information rate (CIR).

Figure 6:
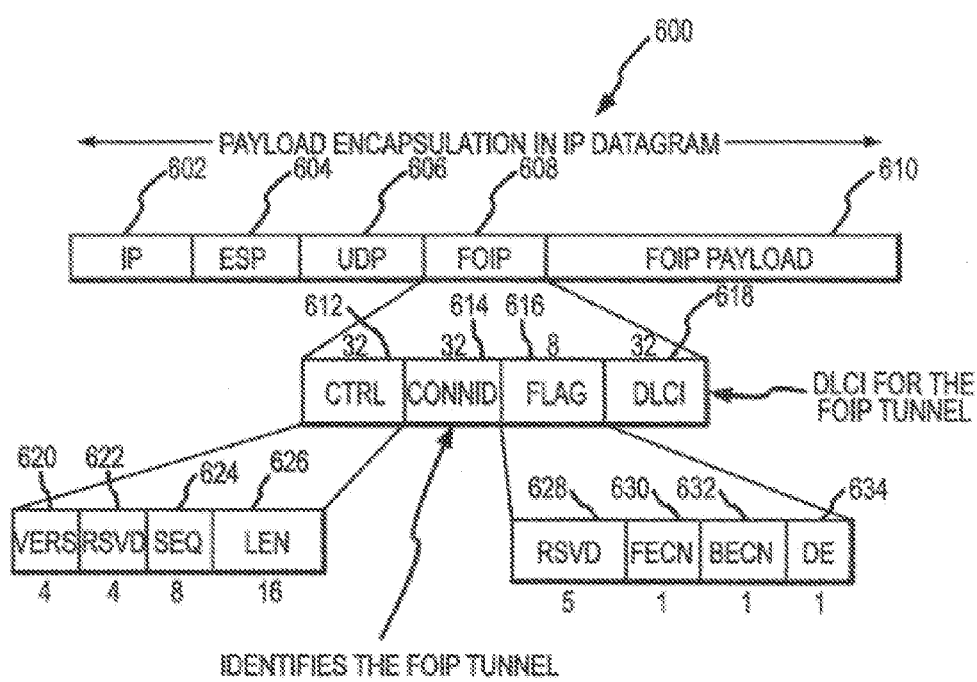
FIG. 6 is an illustration of the frame relay encapsulation of the IP datagram in accordance with one embodiment of the present invention.

FIG. 6 is an illustration of the frame relay encapsulation 600 of the IP datagram for transmission over the Internet by the system 100 or 200. The IP datagram includes an IP field 602, an enhanced service provider (ESP) field 604 indicating enhanced services, a user datagram protocol (UDP) field 606, a frame relay over IP (FOIP) field 608 and the FOIP payload 610. The FOIP field 608 may be further broken down into a control (CTRL) field 612, a connection ID (ConnID) field 614 and flag field 616 and a DLCI field 618. The CTRL field 612 may be further broken down into Vers, Rsvd, Seq for frame sequence order, and Len fields 620-626 as shown in FIG. 6. The flag field 616 may also be broken down into Rsvd, FECN, BECN and DE fields 628-634 that have functions similar to that previously discussed. The frame relay payload encapsulation process will be described in more detail with respect to FIG. 7.

Figure 7:
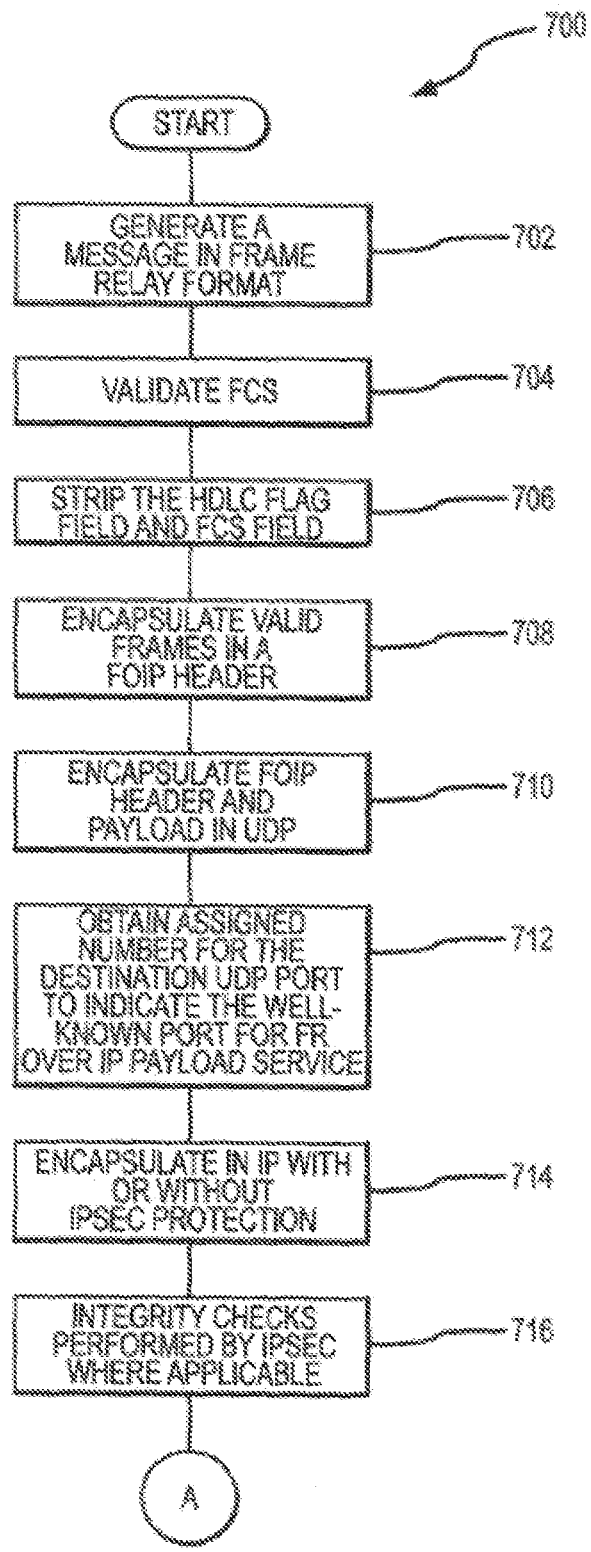
FIG. 7 is a flow chart of a method for frame relay communication over the Internet in accordance with one embodiment of the present invention.
Figure 7:
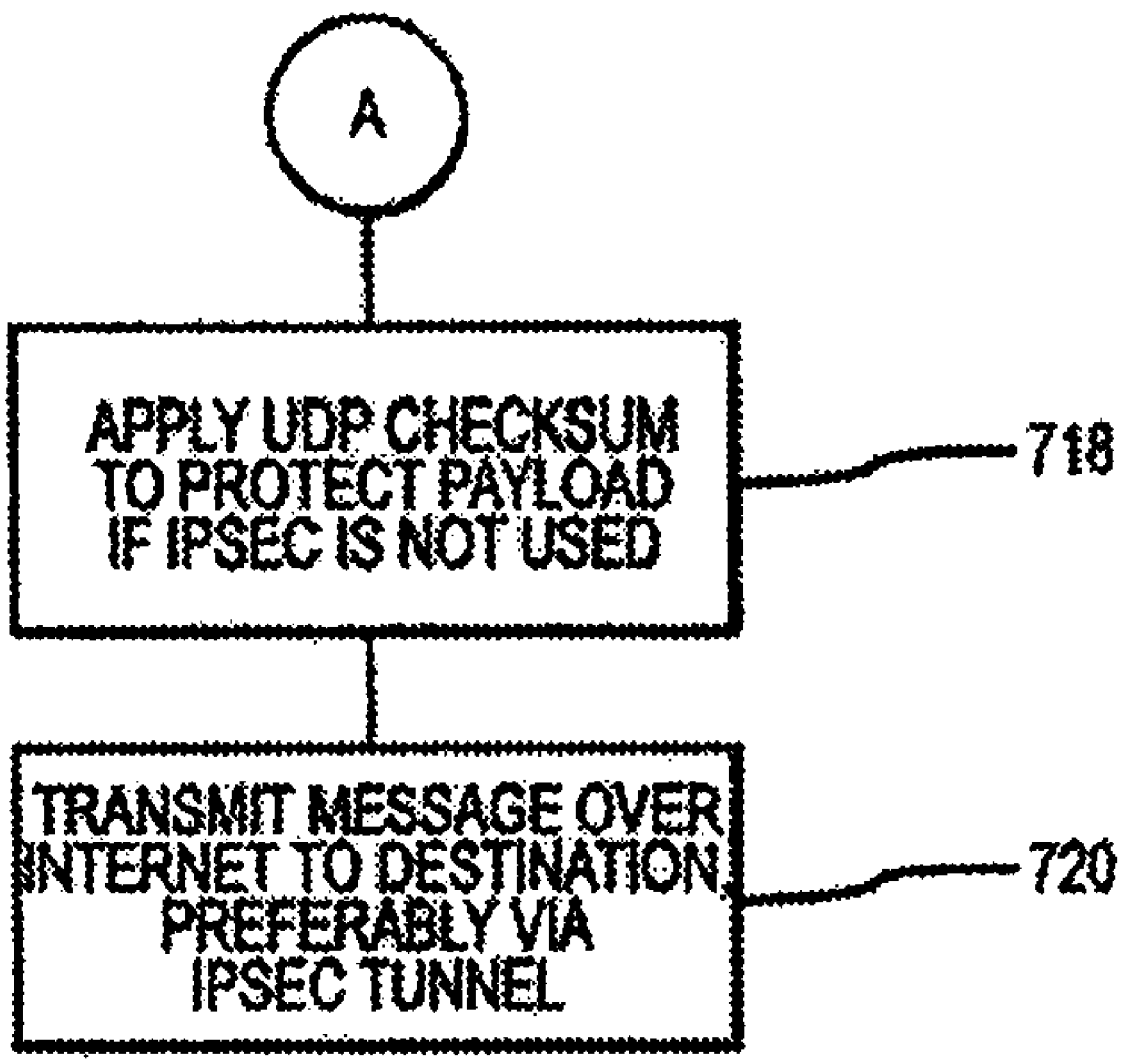

FIG. 7 is a flow chart of the method 700 for frame relay communication over the Internet in accordance with one embodiment of the present invention. In action box 702, a message is created or generated by a user or subscriber 104 in the frame relay protocol or format. The frame check sequence (FCS) is validated in action box 704 and if a frame is found to be valid the HDLC flags and FCS fields are stripped from the message format in action box 706. In action box 708 the valid frames are encapsulated in a FOIP header and in action box 710 the FOIP header and payload are encapsulated in UDP. An assigned number is obtained for the destination UDP port in action box 712 and the message resulting from action box 710 maybe further encapsulated in IP with or without IPSec protection in action box 714. Integrity checks may be performed by IPSec where applicable in action box 716 or a UDP checksum may be applied to the message in action box 718 if IPSec is not used. In action box 720 the resulting message is transmitted over the Internet to the destination, preferably via an IPSec tunnel 122.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A system for communications over the Internet, comprising:
    at least one router connectable to a first user terminal;
    at least one subscriber virtual frame relay switch (VS) connectable to the at least one router and configured to facilitate secure communication of frame relay messages from the first user terminal to a second user terminal over the Internet by encapsulating frame relay header and payload information of the frame relay messages within a payload transport protocol and encrypting and authenticating all packets of the payload transport protocol; and
    at least one virtual router (VR) to connect the VS to the Internet via a firewall and a security module for communications of the encapsulated frame relay messages between the first user terminal and the second user terminal over the Internet.

2. The system of claim 1, further comprising:
    at least a second router connectable to the second user terminal;
    at least a second VS connectable to the second router; and
    at least a second VR to connect the second VS to the Internet for communications between the first user terminal and the second user terminal.

3. The system of claim 1, wherein the communications over the Internet is via an Internet Protocol Security (IPSec) tunnel.

4. The system of claim 1, further comprising a switch-to-switch signaling protocol to communicate signaling and other information between the at least one VS and a second VS.

5. The system of claim 1, further comprising a data link connection identifier (DLCI) to provide routing information to establish a communications link between the first user and the second user and to provide service parameters associated with the communications link.

6. The system of claim 5, wherein the DLCI service parameters comprise at least one of a frame size, a committed information rate (CIR), a committed burst rate (Bc), burst excess size (Be) and committed rate measurement error (Tc).

7. The system of claim 1, further comprising a local management interface (LMI) associated with the VS to respond to status inquiries and make status inquiries regarding other components of the system.

8. The system of claim 1, further comprising an operation support system to control establishment and operation of a communications link between the first user terminal and the second user terminal.

9. The system of claim 1, wherein the at least one VS implements signaling between other VSs in a virtual private network (VPN) for coordination of information transfer between VSs over the Internet and encapsulation of frame relay header and payload information for communication between users over the Internet.

10. The system of claim 1, wherein information is transferred between users in frames, each frame being encapsulated in a payload of an IP datagram and containing a sequence number to preserve the order of the frames.

11. A system for communications over the Internet, comprising:
    a plurality of routers, each router connectable to at least one user terminal;
    a plurality of Internet protocol service switches (IPSXs), each IPSX is connectable to at least one of the plurality of routers and comprises:

a subscriber virtual frame relay switch (VS) connectable to the at least one of the plurality of routers and configured to facilitate secure communication of frame relay messages from the first user terminal to a second user terminal over the Internet by encapsulating frame relay header and payload information of the frame relay messages within a payload transport protocol and encrypting and authenticating all packets of the payload transport protocol; and a virtual router (VR) to connect the VS to the Internet via a firewall and an Internet Protocol Security (IPSec) module for secure frame relay communications between the user terminals associated with each of the routers over the Internet.

12. The system of claim 11, wherein communications over the Internet among the plurality of IPSXs is via IPSec tunnels.

13. The system of claim 11, further comprising a payload transport protocol for communicating frame relay information between the VSs.

14. The system of claim 13, wherein the payload transport protocol organizes the payload information into at least one frame, the at least one frame comprising at least one of the following parameters:
- a frame sequence number (Seq);
- a discard enable bit (DE)
- a forward explicit congestion notification (FECN);
- a backward explicit congestion notification (BECN);
- a data link connection identifier (DLCI); and
- a frame relay over Internet protocol (FOIP) tunnel identification.

15. The system of claim 11, wherein the payload transport protocol is based on user datagram protocol (UDP/JP).

16. The system of claim 15, wherein the frame relay information is encapsulated in a frame relay over Internet protocol (FOIP) header that is then encapsulated in UDP.

17. The system of claim 11, further comprising a switch-to-switch signaling protocol (SSFOIP) to communicate signaling and other information between the different VSs and to provide periodic synchronization of the different VSs.

18. The system of claim 17, wherein the SSFOIP is based on UDP/IP and operates in parallel with the payload transport protocol.

19. The system of claim 11, further comprising a frame relay local management interface (LMI) associated with each VS to respond to and send component status inquiries.

20. The system of claim 11, further comprising an operations support system (055), the 055 establishing a permanent virtual circuit (PVC) between each of the user terminals in a virtual private network (VPN).

21. The system of claim 20, wherein the OSS installs the address information in each VS to communicate with all the other VSs in the VPN.

22. The system of claim 11, wherein each router has at least one data link connection identifier (DLCI) associated therewith comprising routing information to establish a communications link between the other routers in a virtual private network (VPN) and to provide service parameters associated with the users level of frame relay service.

23. The system of claim 11, further comprising a services management system to permit IP service providers to deploy, manage and account for IP services.

24. The system of claim 11, further comprising a customer network management system to permit subscribers to monitor service status, generate reports and forecasts for network planning and service modification.

25. A method for communicating over the Internet, comprising:
receiving a frame relay message from a first subscriber terminal at a first Internet Protocol service switch (IPSX), the first IPSX including a subscriber virtual frame relay switch (VS) coupled to the first subscriber terminal, a virtual router (VR) to connect the VS to the Internet through a firewall and an Internet Protocol Security (IPSec) module;
the first IPSX encapsulating the frame relay message in a frame relay over IP (FOIP) header;
the first IPSX encapsulating the FOIP header and any payload information in user datagram protocol (UDP/IP); and
the first IPSX transmitting the UDP/IP encapsulated frame relay message over the Internet to a second subscriber terminal via an Internet Protocol Security (IPSec) tunnel between the first IPSX and a second IPSX.

26. The method of claim 25, further comprising stripping any overhead information in the frame relay message and encapsulating valid frames in the FOIP header.

27. A system comprising:
a plurality of user terminals;
a plurality of frame relay over Internet Protocol (FOIP) switches configured to securely transmit frame relay messages among the plurality of user terminals over a public IP network, each FOIP switch including a subscriber virtual frame relay switch (VS), a virtual router (VR), a firewall and a security module, the VS configured to interface with one user terminal of the plurality of user terminals and to provide access to the public IP network via the VR, the firewall and the security module;
a VPN associated with the plurality of FOIP switches formed and maintained by establishing Internet Protocol Security (IPSec) tunnels among the plurality of VRs and exchanging signaling information among the plurality of VSs using a switch-to-switch signaling protocol; and
wherein a frame relay message originated by a first user terminal of the plurality of user terminals and destined for a second user terminal of the plurality of user terminals is transmitted by a first FOIP switch of the plurality of FOIP switches by encapsulating a frame relay header and payload information of the frame relay message within a payload transport protocol, encrypting and authenticating all resulting packets and forwarding the encrypted resulting packets to a second FOIP switch via an IPSec tunnel between a first VR of the first FOIP switch and a second VR of the second FOIP switch.

28. The system of claim 27, wherein the OSS installs the address information in each VS to communicate with all the other VSs in the VPN.

29. A system for communications over the Internet, comprising:
a plurality of routers, each router connectable to at least one user terminal; a plurality of frame relay over Internet Protocol (FOIP) switches, each FOIP switch is connectable to at least one of the plurality of routers and comprises:
a subscriber virtual frame relay switch (VS) connectable to the at least one of the plurality of routers and configured to facilitate secure communication of frame relay messages from the first user terminal to a second user terminal over the Internet by encapsulating frame relay header and payload information of the frame relay messages within a payload transport protocol and encrypting and authenticating all packets of the payload transport protocol; and a virtual router (VR) to connect the VS to the Internet via a firewall and an Internet Protocol Security (IPSec) module for secure frame relay communications between the user terminals associated with each of the routers over the Internet.

30. The system of claim 29, wherein communications over the Internet among the plurality of FOIP switches is via IPSec tunnels.

31. The system of claim 29, further comprising a payload transport protocol for communicating frame relay information between the VSs.

32. The system of claim 31, wherein the payload transport protocol organizes the payload information into at least one frame, the at least one frame comprising at least one of the following parameters:
   a frame sequence number (Seq);
   a discard enable bit (DE)
   a forward explicit congestion notification (FECN);
   a backward explicit congestion notification (BECN);
   a data link connection identifier (DLCI); and
   a FOIP tunnel identification.

33. The system of claim 29, wherein the payload transport protocol is based on user datagram protocol (UDP/IP).

34. The system of claim 33, wherein the frame relay information is encapsulated in a FOIP header that is then encapsulated in UDP.

35. The system of claim 29, further comprising a switch-to-switch signaling protocol (SSFOIP) to communicate signaling and other information between the different VSs and to provide periodic synchronization of the different VSs.

36. The system of claim 35, wherein the SSFOIP is based on UDP/JP and operates in parallel with the payload transport protocol.

37. The system of claim 29, further comprising a frame relay local management interface (LMI) associated with each VS to respond to and send component status inquiries.

38. The system of claim 29, further comprising an operations support system (OSS), the OSS establishing a permanent virtual circuit (PVC) between each of the user terminals in a virtual private network (VPN).

39. The system of claim 29, wherein each router has at least one data link connection identifier (DLCI) associated therewith comprising routing information to establish a communications link between the other routers in a virtual private network (VPN) and to provide service parameters associated with the users level of frame relay service.

40. A method for communicating over the Internet, comprising:

receiving a frame relay message from a first subscriber terminal at a first frame relay over Internet Protocol (FOIP) switch, the first FOIP switch including a subscriber virtual frame relay switch (VS) coupled to the first subscriber terminal, a virtual router (VR) to connect the VS to the Internet through a firewall and an Internet Protocol Security (IPSec) module;

the first FOIP switch encapsulating the frame relay message in a FOIP header;

the first FOIP switch encapsulating the FOIP header and any payload information in user datagram protocol (UDP/JP); and the first FOIP switch transmitting the UDP/IP encapsulated frame relay message over the Internet to a second subscriber terminal via an Internet Protocol Security (IPSec) tunnel between the first FOIP switch and a second FOIP switch.

* * * * *

UNITED STATES PATENT AND TRADEMARK OFFICE
CERTIFICATE OF CORRECTION

PATENT NO.         : 7,263,106 B2                                            Page 1 of 1
APPLICATION NO.    : 10/067106
DATED              : August 28, 2007
INVENTOR(S)        : Matthews et al.

It is certified that error appears in the above-identified patent and that said Letters Patent is hereby corrected as shown below:

Claim 11:

Column 7, Line 2, delete "routers" and insert --router--

Claim 15:

Column 7, Line 33, delete "(UDP/JP)" and insert --(UDP/IP)--

Claim 20:

Column 7, Line 49, delete "055" and insert --OSS--

Claim 29:

Column 8, Line 64, delete "routers" and insert --router--

Claim 40:

Column 10, Line 30, delete "(UDP/JP)" and insert --(UDP/IP)--

Signed and Sealed this

Seventh Day of July, 2009

JOHN DOLL
*Acting Director of the United States Patent and Trademark Office*